INVENTORS
Christopher E. G. Bailey
Eric Metcalf
BY
Michael P. Breston
ATTORNEY

DIGITAL VOLTMETER CONTROLLED BY INCREMENTS OF ELECTRICAL CHARGE APPLIED TO A CAPACITOR FEEDBACK AMPLIFIER

Filed May 28, 1965

INVENTORS
Christopher E. G. Bailey
Eric Metcalf
BY
Michael P. Breston
ATTORNEY

United States Patent Office 3,439,272

Patented Apr. 15, 1969

3,439,272

DIGITAL VOLTMETER CONTROLLED BY INCREMENTS OF ELECTRICAL CHARGE APPLIED TO A CAPACITOR FEEDBACK AMPLIFIER

Christopher E. G. Bailey and Eric Metcalf, Farnborough, England, assignors to The Solartron Electronic Group Limited, Farnborough, Hampshire, England Filed May 28, 1965, Ser. No. 459,540
Claims priority, application Great Britain, May 27, 1964, 21,986/64
Int. Cl. G01r *15/00*
U.S. Cl. 324—111 9 Claims

ABSTRACT OF THE DISCLOSURE

The apparatus is a digital voltmeter employing an integrator for storage of an unknown signal and means to incrementally discharge the integrator to a predetrmined level. The unknown signal is applied to the integrator by first applying the unknown signal to a reactive impedance storage element and thereafter transferring the stored signal to the integrator.

This invention relates to digital voltmeters, that is to any voltmeters which incorporate a counter in which a measure of the applied voltage is obtained as an integral number. In practice the counter may be binary, binary coded decimal or decimal and may give a visual display, command a printer or act as a direct source of coded information to a computer. It will be understood that, although the term voltmeter is used as is customary because instruments of the type in question are most commonly used to measure potential, the instruments may of course also be applied to the measurements of current, charge or other related quantities.

One known form of voltmeter generates a ramp voltage which is compared with the applied voltage. Clock pulses are gated into the counter from the time of commencement of the ramp until the ramp voltage equals the applied voltage. It is difficult and expensive to design a ramp generator of high linearity and this method is ordinarily restricted to voltmeters of moderate precision, 1% to 0.1%.

Another known form of voltmeter compares the applied voltage with the output of a set of switches with weighted outputs forming a binary or binary coded decimal series. Controlling logic compares the applied voltage with the weighted outputs in descending order of magnitude, each freshly switched-in weighted output being left in if the total is less than the applied voltage but switched out again if the total exceeds the applied voltage. Assuming a binary series of weights the total number of comparisons is $\log_2 S$ where S is the "range number" or ratio of the "full-scale" reading to the lowest determinable input. Such comparisons can be carried out in the time of $\log_2 S$ clock pulses whereas the previous method requires S clock pulses for a "full-scale" reading. The gain of speed is important and the voltmeter may be made very accurate but $\log_2 S$ precision resistors are necessary and $\log_2 S$ switches which must be relays or precision diode clamps. This method is therefore expensive.

In order to obtain precision without expense it has been proposed to apply the voltage to be measured to an integrating amplifier for a measured number of clock pulses and thereafter to count the number of times that a standard quantum of charge must be applied to the amplifier to bring its output back to zero. Alternatively the said voltage is applied continuously and a short-term stable oscillator determines clock intervals in each of which a quantum of charge is or is not applied, depending on whether the amplifier output exceeds or is within a given threshold level. The magnitude of the applied voltage is given by the ratio of the number of quanta of charge applied to the number of clock pulses in any suitable interval. In either event two counters are implied: one for counting a standard number of clock pulses and another for counting the number of quanta of charge applied. Very few precision components are required however and accuracy can be obtained at moderate cost.

The object of the present invention is to reduce the cost of a high accuracy digital voltmeter even further by eliminating the need for more than one counter. In addition, no oscillator is necessary in carrying out this invention although such may be used for a special purpose as subsequently explained.

According to the invention a digital voltmeter comprises a reactive impedance, means for switching the impedance initially to a signal to be measured to establish a voltage across or current in the impedance, means for thereafter connecting the impedance to a feedback amplifier whose output is applied to a level discriminator under the control of which a standard increment of charge or current is repeatedly applied to the amplifier in opposition to that applied by the impedance until the amplifier output level returns to a datum value and a counter arranged to count the number of the said increments.

The reactive impedance is preferably a capacitor across which the voltage to be measured is initially established and from which increments of charge are then removed until the voltage returns to a datum, say 0 volts, but the preceding, broader statement of invention takes into account the duality between a capacitor and voltage (or current) on the one hand and an inductor and current (or voltage) on the other hand.

For reasons which will hereinafter be explained the amplifier is preferably of substantial negative gain and shunted by a capacitor. A resistor or resistive circuit is preferably placed in series with the first-mentioned capacitor and this resistor or circuit may be so arranged that the current from the first-mentioned capacitor is approximately constant over a range of voltages across the capacitor.

The invention will now be described in more detail by way of example with reference to the accompanying drawings, in which:

FIG. 1 is a circuit diagram of one embodiment of the invention;

FIG. 1*b* illustrates a modification of FIG. 1;

Figure 1:
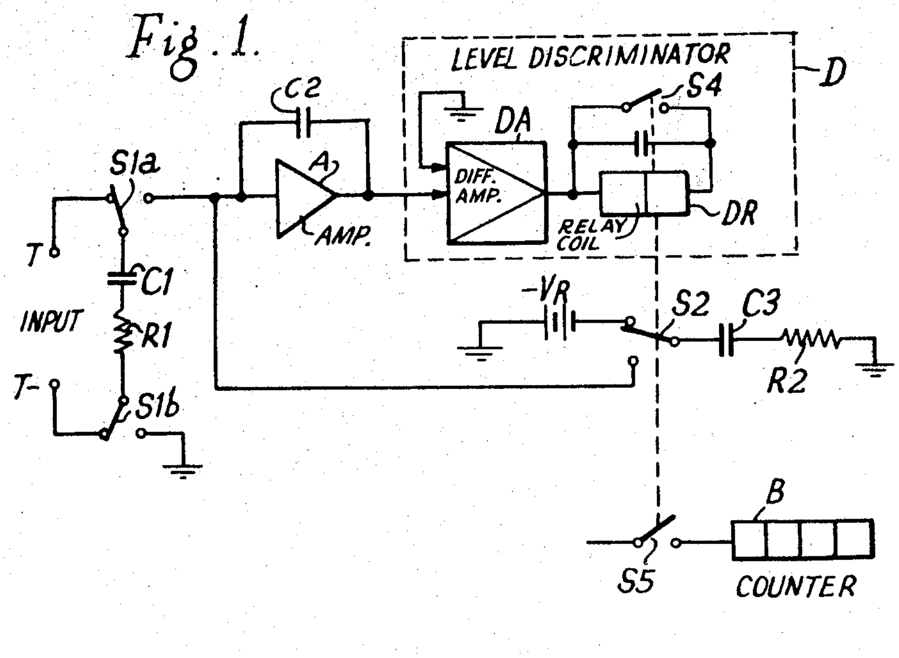

In FIG. 1 the voltage to be measured is applied to terminals T. A first capacitor $C_1$ in series with a first resistor $R_1$ is connected by a two-pole switch $S1_a$, $S1_b$ first to the input voltage to be measured and then between system ground and the input of an "operational" amplifier A shunted by a second capacitor $C_2$. The output of the amplifier is applied to a level discriminator D.

The level discriminator may take any suitable conventional form, as described for example in "Waveforms" pp. 358 (vol. 19 of the M.I.T. Radiation Laboratory Series). Typically it will consist of a difference amplifier DA with one input grounded and the other connected to the output of the amplifier A and a relay DR forming the difference amplifier load. The relay has three spring sets. One set S4 is used in known manner to cause the relay to operate repeatedly when the output level of A departs from the datum value. The second set is the contacts S2 whose purpose is described below and the third set S5 operates the counter B.

When the output of the amplifier A exceeds a certain level, for example goes negative with respect to system ground, the level discriminator operates the switch $S_2$ and the counter B, causing the counter to add once and this addition will occur repeatedly so long as the said level is exceeded. Operation of S1 causes a capacitor $C_3$, previously charged to reference $-V_R$ to discharge into the input of the amplifier A. $V_R$ may be a standard cell or for example, the drop across a Zener diode. It is important that the peak charging and discharging currents of $C_3$ be limited by a resistor $R_2$, and then that the period of dwell of $S_2$ in each position be sufficient substantially to charge and to discharge $C_3$.

If the initial state of A is that its input is zero and its output close to the threshold of D, and if the input voltage has the correct sense, then D will continue to cause $S_2$ to operate and B to count, until the voltage at A has returned to zero. Since A is an "operational" amplifier, i.e. the product of its gain and its input resistance is large, this occurs when there is no net charge at its input. The condition for this is that $$V_1C_1+NV_RC_3=0$$

where $V_1$ is the input voltage, and N is the count in B. Thus $$V_1=N(V_RC_3/C_1)$$

and if $V_R$, $C_1$ and $C_3$ are all established with precision, N is a measure of $V_1$.

The resistor $R_1$ is not essential but limits the current into the amplifier. In the discussion so far, the role of $C_2$ has not emerged and, indeed, the device would work as described without this capacitor. We shall now examine the output waveform of A, and show reasons for including this component.

The input of A is a virtual earth, and into it are fed three currents whose sum is substantially zero, viz:

$$V_1/R_1 \exp\ (-t/C_1\cdot R_1)\ -V_RC_3n+C_2dV_2/dt=0$$

where $t$ is the time elapsed since connecting $C_1$ to A, $n$ is the number of actuations per second of $S_2$, and $V_2$ is the amplifier output voltage, here assumed to be zero when $t=0$. Integrating and solving for $V_2$ we have $$V_2=V_RC_3/C_2\int_0^t n\,dt-V_1C_1/C_2\exp\ (-t/C_1.R_1)$$

Figure 2:
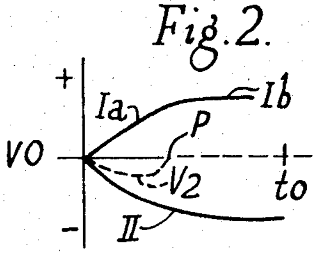
FIG. 2 is an explanatory diagram.

The first and second of these terms are illustrated in FIG. 2 marked $I_a$ and II respectively; their sum is depicted by the dashed-line voltage waveform in this figure marked $V_2$. In FIG. 2, it has been assumed that the sum is initially negative. It will be seen that $V_2$ first moves to a minimum and then returns to zero; during all of this time, $n$ is constant at the maximum rate at which the relay DR has been designed to operate. At the point P, while $V_2$ returns to 0, a new regime sets in; $V_2$ remains nearly at zero and $n$ decreases in such a way that the prolongation of curve $I_a$, namely $I_b$, is nearly the mirror image of II. Finally, at time $t_0$, when $S_2$ has ceased to act, the process is completed and the switch S1 may be returned to the position shown in FIG. 1.

The circuit described is a compromise among various desirable features, one being to make $t_0$ as short as possible for a given maximum rate of $n$ and a given range number S. This makes a prolonged regime $I_a$ desirable. Otherwise it would be necessary to increase $R_1$ and hence $t_0$. It is also desirable to make the peak excursion of $V_2$ as small as possible and this shows why the capacitor $C_2$ is desirable.

Figure 1B:
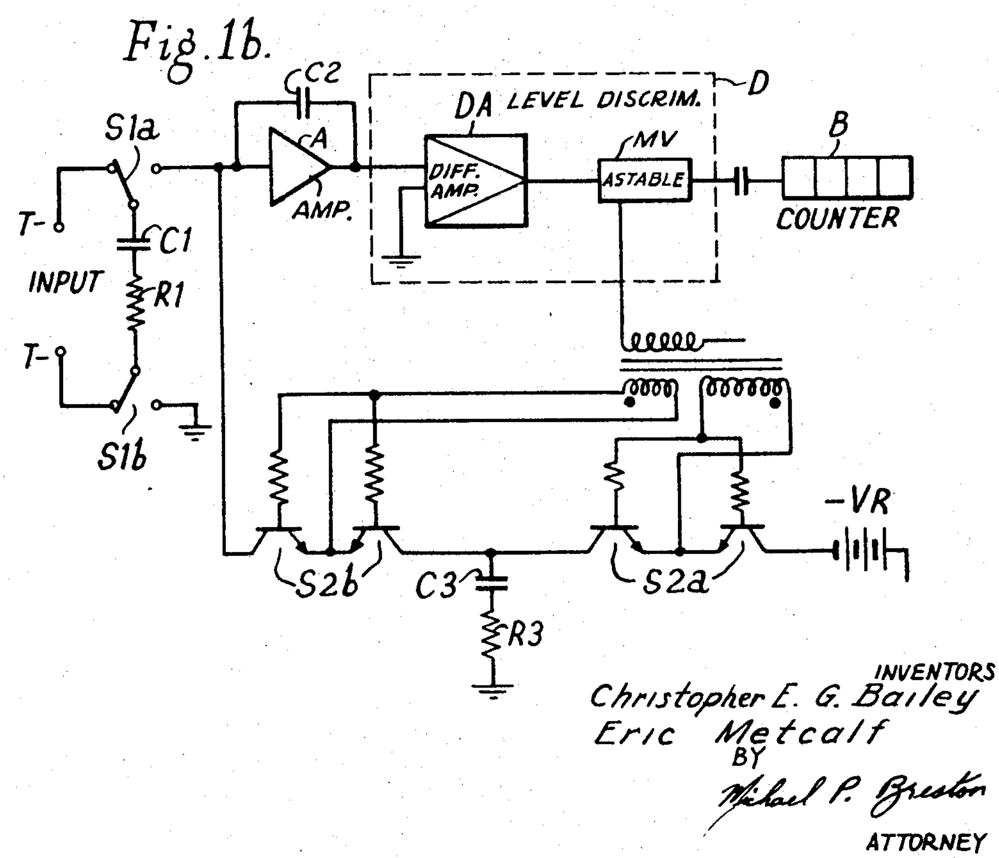

In the alternative arrangement shown in FIG. 1*b*, the relay DR is replaced by an astable (or free-running) multivibrator MV which is shut off so long as the output level of the amplifier A does not exceed the datum value, but which runs whenever the datum level is exceeded. The multivibrator can be coupled capacitively to the counter B and S2 is replaced by a conventional arrangement of transistor switches S2*a* and S2*b* transformer coupled to the multivibrator.

Figure 3:
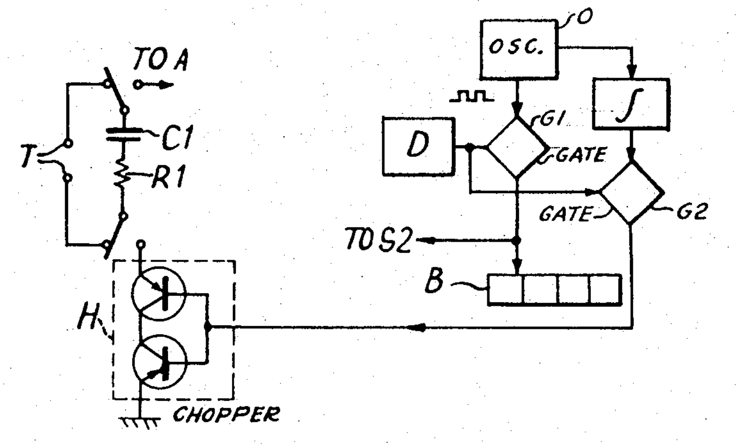
FIGS. 3 and 4 are circuit diagrams illustrating two further modifications to the circuit of FIG. 1.

In a modification of the invention, we substitute for $R_1$ a device passing a substantially constant current in response to a suitable wide range of impressed volts. This current is made just less than the maximum obtainable from S2. One form of suitable constant-current resistance is that manufactured by the Circuitdyne Corporation, California under the trade nameof Currectors. Another, and preferred modification is shown in FIG. 3.

The level discriminator D now need consist only of a difference amplifier whose output goes to two gates. The first, a sharp on-off gate $G_1$ is fed with a train of square waves from an oscillator O and passes these, all or none, to the switch S2, e.g. the transistorised switches S2*a* and S2*b*. Each square wave reaching the switch causes $C_3$ to discharge into A once. These square waves are also applied to the counter B. The second gate, a proportional gate G2, is fed with triangular waves (formed by integration of the square waves) and passes the peaks of these, to a greater or less extent varying reversely with the amount of negative voltage out of D, to a chopper H in series with a resistor R1 of much decreased value. H is turned on with a variable mark/space ratio and so automatically adjusts the rate of discharge of C1 so as to maintain V2 slightly negative. The circuit constants are chosen so that when V2 is permissibly negative the current from C1 never exceeds the current from S2. $G_2$ may alternatively be referred to as a clipper, with clipping level set by D.

In order to achieve the conditions outlined above it is merely necessary to adjust the relative sensitivities of the gates $G_1$ and $G_2$ appropriately. For example, the amplifier A may have a saturation output of 30 v. and the level discriminator D may have a voltage gain of 30 and saturate at 10 v. output, corresponding to 330 mv. out of A. The gate $G_2$ may be so biased that only the tops of the triangular waves are passed when the output of D is 10 v. but increasing portions of the waves are passed as the output of D falls below this saturation level. $G_1$ is however arranged to open at 300 mv., corresponding to 10 mv. out of A.

As the input of A is restored at the end of each cycle of S1 nearly to zero and its output nearly to the level at which D operates, very little demand is made on its drift stability. It may, however, be A.C. coupled with a time-constant of at least the order of the time-cycle of S1.

Figure 4:
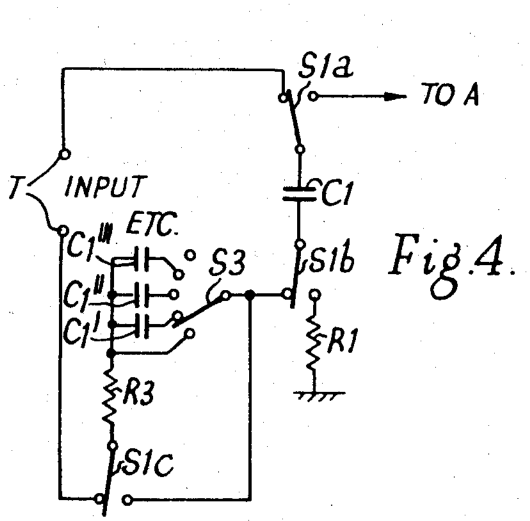

Means for extending the range can consist of switching means for a set of capacitors C1 with or without simultaneous switching of R1, or they can consist of the circuit of FIG. 4. Here the range is extended in the ratio $1:1+C_1/C_1^1$ by the switch S3. This arrangement is particularly suitable for use with a chopper in place of R1.

When S1 is a 2-pole switch, it can also be made reversing to read a voltage of either polarity. A level discriminator responsive to positive voltage can then be added to reverse the switch S1 and/or affect other suitable parts of the apparatus including indicating means, in order to provide automatic response to an input of either polarity.

We claim:

1. In a digital voltmeter, the combination of:
a reactive impedance,
an amplifier having an input and an output, an amplifier feedback circuit including a capacitor for coupling the amplifier output to the amplifier input,
means for switching said reactive impedance initially to a signal to be measured to store electrical energy in said impedance,
means for thereafter connecting said impedance to the amplifier to discharge an electrical charge into the amplifier input,
level discriminating means connected to the output of the amplifier and responsive to deviations in the amplifier output level from a datum value,
means responsive to the level discriminating means for feeding a fixed increment of charge into the amplifier input in opposition to the charge from the said impedance, and a counter for counting the number of times that a fixed increment of charge is fed into the amplifier input.

2. In a digital voltmeter, the combination of:

a first capacitor, an amplifier having an input and an output and including a feedback circuit for coupling the amplifier output to the amplifier input, a second capacitor connected in said feedback circuit for supplying a charge to the amplifier input which is a function of the voltage at the amplifier output, means for switching the first capacitor initially to a voltage to be measured to store charge in the first capacitor, means for thereafter connecting the first capacitor to the amplifier to discharge into the amplifier input, level discriminating means connected to the output of the amplifier and responsive to deviations in the amplifier output voltage level from a datum value, means responsive to the level discriminating means for feeding a fixed increment of charge into the amplifier input in opposition to the charge from the said first capacitor, and a counter for counting the number of times that a fixed increment of charge is fed into the amplifier input.

3. A digital voltmeter according to claim 2, comprising a current limiting resistor in series with the first capacitor.

4. A digital voltmeter according to claim 3, wherein the resistor has voltage-current characteristics such as to tend to maintain the current therethrough constant.

5. A digital voltmeter according to claim 2, comprising third switching means in series with the first capacitor, means for repeatedly opening and closing the third switching means, and means for varying the mark-space ratio of the means for opening and closing the third switching means in response to the amplifier output level.

6. In a digital voltmeter, the combination of:

a first capacitor, an amplifier having an input and an output and including a feedback circuit for coupling the amplifier output to the amplifier input, a second capacitor coupled in said feedback circuit for supplying a charge to the amplifier input which is a function of the voltage at the amplifier output, means for switching the first capacitor initially to a voltage to be measured to store charge in the first capacitor, means for thereafter connecting the first capacitor to the amplifier to discharge into the amplifier, level discriminating means connected to the output of the amplifier and responsive to deviations in the amplifier output level from a datum value, a third capacitor, a source of reference voltage for charging the third capacitor, further switching means responsive to the level discriminating means to assume a normal state when the amplifier output level does not deviate from the datum value and to assume an operated state when the amplifier output level does deviate from the datum value, the further switching means connecting the third capacitor to the reference voltage source in the normal state and discharging the third capacitor into the amplifier in the operated state in opposition to the first capacitor, and a counter for counting the number of times that the further switching means are operated.

7. In a digital voltmeter, the combination of:

a first capacitor, an operational amplifier having an input and an output, an amplifier feedback circuit including a second capacitor for coupling the amplifier output to the amplifier input, means for switching the first capacitor initially to a voltage to be measured to store charge in the first capacitor, means for thereafter connecting the first capacitor to the amplifier to discharge into the amplifier, level discriminating means connected to the output of the amplifier and responsive to deviations in the amplifier output level from a datum value, a source of square pulses, a gate connected to the source and responsive to the level discriminating means for passing square pulses only when the amplifier output level deviates from the datum value, means connected to the gate and responsive to each square pulse passed thereby to feed a fixed increment of charge into the amplifier in opposition to the charge from the first capacitor, and a counter for counting the number of square pulses passed by the gate.

8. A digital voltmeter according to claim 7, comprising, means for integrating the square pulses to produce a sawtooth wave, means for clipping the sawtooth wave to produce pulses having a mark-space ratio determined by the clipping level of the clipping means, means for varying the clipping level of the clipping means in response to the output level of the amplifier, and third switching means in series with the first capacitor and responsive to the variable mark-space ratio pulses repeatedly to open and close with variable mark-space ratio.

9. In a digital voltmeter, the combination of, two input terminals, a first capacitor, variable capacitive means, an operational amplifier having an input and an output, an amplifier feedback circuit including a second capacitor for coupling the amplifier output to the amplifier input, changeover switching means having a first position for connecting the first capacitor and the variable capacitive means between the two input terminals, and having a second position for connecting the first capacitor only to discharge into the amplifier and for discharging the variable capacitive means other than into the amplifier, level discriminating means connected to the output of the amplifier and responsive to deviations in the amplifier output voltage level from a datum value, means responsive to the level discriminating means for feeding a fixed increment of charge into the amplifier in opposition to the charge from the said first capacitor, and a counter for counting the number of times that a fixed increment of charge is fed into the amplifier.

References Cited

UNITED STATES PATENTS

| | | | |
|---|---|---|---|
| 2,713,135 | 7/1955 | Macklen | 324—111 |
| 3,140,479 | 7/1964 | Chase | 340—347 |
| 3,188,455 | 6/1965 | Quick | 340—347 XR |
| 3,218,630 | 11/1965 | Jankovich | 340—347 |
| 3,237,190 | 2/1966 | Summers | 340—347 |
| 3,251,052 | 5/1966 | Hoffman et al. | 340—347 |
| 3,281,827 | 10/1966 | Olshausen et al. | 340—347 |

RUDOLPH V. ROLINEC, *Primary Examiner.*

E. F. KARLSEN, *Assistant Examiner.*

U.S. Cl. X.R.

324—99; 340—347